No. 805,284. PATENTED NOV. 21, 1905.
C. M. GREENWAY & J. HORNER.
FISH HOOK.
APPLICATION FILED FEB. 14, 1905.
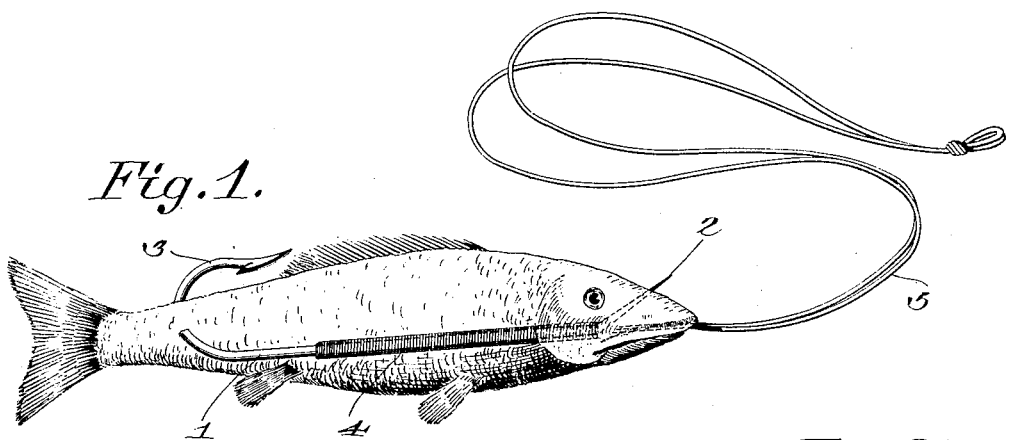
Fig. 1.
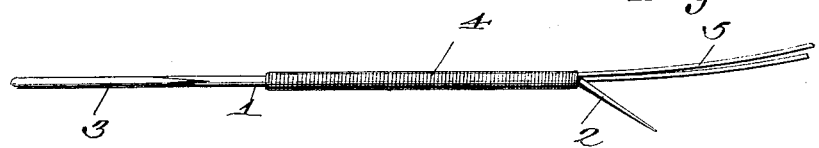
Fig. 2.
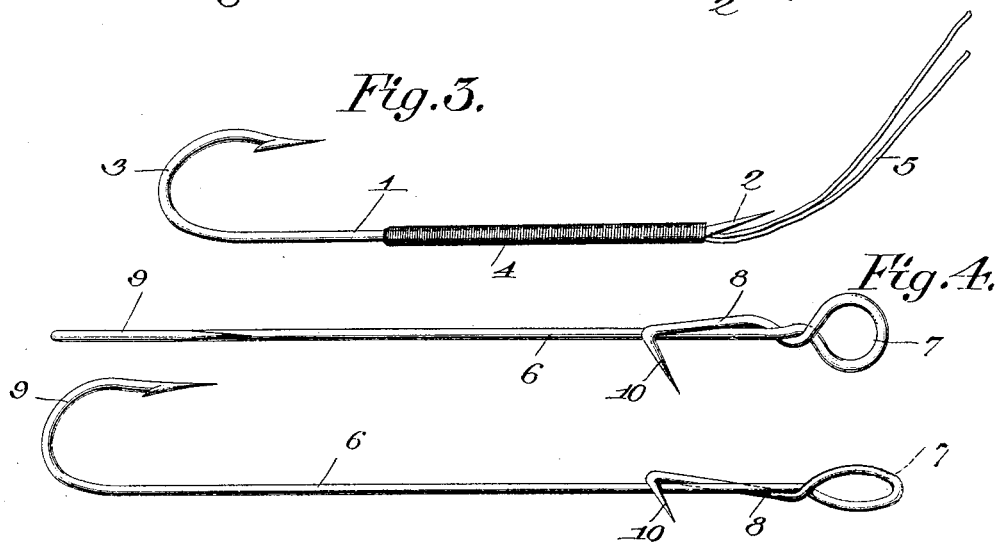
Fig. 3.
Fig. 4.
Fig. 5.
Charles M. Greenway and
Joseph Horner, Inventors
Witnesses:
by C. A. Snow & Co.
Attorneys.

UNITED STATES PATENT OFFICE.

CHARLES M. GREENWAY AND JOSEPH HORNER, OF GRAND RAPIDS, MICHIGAN.

FISH-HOOK.

No. 805,284.　　　Specification of Letters Patent.　　　Patented Nov. 21, 1905.

Application filed February 14, 1905. Serial No. 245,603.

*To all whom it may concern:*

Be it known that we, CHARLES M. GREENWAY and JOSEPH HORNER, citizens of the United States, residing at Grand Rapids, in the county of Kent and State of Michigan, have invented a new and useful Fish-Hook, of which the following is a specification.

This invention relates to fish-hooks.

As is well known, all fishermen have a great deal of trouble in guarding against loss of the bait, more particularly live bait, due to the fact that the hook is secured through the mouth of the bait, thus leaving its entire body exposed for a fish to bite without touching the hook. Of course there are many game fish that always try to swallow the minnow from its head end, and these are generally hooked; but there are other fish that bite from the tail of the bait, and it is this class of fish that is the most trouble to anglers, for the reason above stated. Furthermore, where a line is drawn through a strong current or in drawing the hook rapidly through the water there is always more or less danger of detaching the bait, owing to the fact that its connection with the hook is of a very weak and delicate character.

It is the object of the present invention in a ready, simple, and practical manner to obviate the above objectionable features by providing a fish-hook in which the bait will be positively held against the accidental separation therefrom, in which the barb of the hook may be disposed at the tail instead of at the head of the fish, so that should the fish strike the bait near the tail it will be liable to be hooked, and, further, to provide a hook which will keep the minnow or other live bait straight while in the water and after it is dead.

With the above and other objects in view, as will appear as the nature of the invention is better understood, the same consists in the various novel details of a fish-hook, as will be hereinafter fully described and claimed.

In the accompanying drawings, forming a part of this specification, and in which like characters of reference indicate corresponding parts, there are illustrated two forms of embodiment of the invention, each capable of carrying the same into practical operation, it being understood that the elements therein exhibited may be varied or changed as to shape, proportion, and exact manner of assemblage without departing from the spirit thereof.

In the drawings, Figure 1 is a view in perspective, exhibiting one form of the hook combined with a fish and showing the manner in which the impaling-point performs its function. Fig. 2 is an edge view of a hook, the snood being omitted. Fig. 3 is a perspective view of the hook shown in Figs. 1 and 2 with the snood combined therewith. Fig. 4 is an edge view of a modified form of fish-hook. Fig. 5 is a perspective view of the form of hook shown in Fig. 4.

Referring to the drawings and to Figs. 1 to 3 thereof, there is shown an ordinary fish-hook 1, the line-engaging end 2 of the shank of which is deflected or bent at an angle to the shank and at right angles to the bend 3 of the hook proper. This deflected portion 2 constitutes an impaling-point and is sharpened for this purpose and projects some distance beyond the wrapping 4 of the snood 5, as clearly shown in Fig. 3. In the use of this form of the invention the hook 3 is passed into the mouth of the minnow and out through its gills, and the impaling-point 2 is then forced through the roof of the mouth of the minnow, as shown in Fig. 1, thereby positively impaling the head upon the point, while the hook 3 is passed laterally through the body of the fish near its tail. It will be seen from this that not only is the fish doubly secured upon the hook, but that it will be held straight after death, and, further, should a fish try to take the bait from the tail it will almost inevitably be caught or hooked.

In the form of embodiment of the invention shown in Figs. 4 and 5, in which the snood is omitted, the terminal of the shank 6 of the hook is formed into an eye 7 and thence disposed along the side of the shank for a short distance, as at 8, and thence bent across the shank and at right angles to the hook 9, as shown at 10, to present the impaling-point. This form of hook may be used where a snood is not employed and will be found as effective for the purpose designed as the form of invention shown in Fig. 1.

Of course it will be understood that these fish-hooks may be made in various sizes to suit different kinds of fish and, further, that two or more hooks may be combined in the manner common and well known, and as this will be well understood detailed illustration thereof is deemed unnecessary.

Having thus described the invention, what is claimed is—

1. A fish-hook having its line-engaging terminal provided with an impaling-point.

2. A fish-hook provided at its line-engaging end with an impaling-point disposed at an angle to the shank.

3. A fish-hook having the line-engaging end of its shank formed into an impaling-point obliquely disposed relatively to the shank and arranged at right angles to the bend of the hook proper.

4. A fish-hook having the line-engaging end of its shank formed with an eye and with an impaling-point adjacent thereto.

In testimony that we claim the foregoing as our own we have hereto affixed our signatures in the presence of two witnesses.

CHARLES M. GREENWAY.
JOSEPH HORNER.

Witnesses:
HERBERT P. BLANCHARD,
MERTON B. KNETTLE.